United States Patent [19]

Ottewell et al.

[11] 4,213,485

[45] Jul. 22, 1980

[54] HOSE

[75] Inventors: Roger J. Ottewell, Birmingham; Jack M. Lowe, Sutton Coldfield, both of England

[73] Assignee: Dunlop Limited, London, England

[21] Appl. No.: 928,146

[22] Filed: Jul. 26, 1978

[30] Foreign Application Priority Data

Jul. 28, 1977 [GB] United Kingdom .............. 31730/77

[51] Int. Cl.² ............................................. F16L 11/08
[52] U.S. Cl. .................................. 138/130; 138/131; 138/133; 138/135; 138/139
[58] Field of Search ............... 138/130, 133, 134, 131, 138/132, 139, 135

[56] References Cited

U.S. PATENT DOCUMENTS

| | | | |
|---|---|---|---|
| 1,053,394 | 2/1913 | Hubbell | 138/134 |
| 2,187,873 | 1/1940 | Bratz | 138/130 |
| 3,559,693 | 2/1971 | Reynard | 138/133 |
| 3,866,633 | 2/1975 | Taylor | 138/130 |
| 3,916,723 | 11/1975 | Hawtree et al. | 138/131 |

Primary Examiner—Lenard A. Footland
Attorney, Agent, or Firm—Stevens, Davis, Miller & Mosher

[57] ABSTRACT

A flexible hose comprising a lining layer of substantially impermeable material, a reinforcement structure comprising at least one balanced pair of helically extending reinforcement members embedded in elastomeric material to withstand internal pressure and axial tensile loadings, and radially inwards of at least the reinforcement structure a crush resisting armouring layer comprising at least two helical reinforcing elements nested together and shaped such that contacting surfaces of the elements between the successive turns of the helices are of a substantially frusto-conical shape.

27 Claims, 5 Drawing Figures

HOSE

This invention relates to hose and in particular, though not exclusively, to crush resistant oil delivery hose.

Hose used for example for the conveyance of oil from underwater oil wells requires on the one hand to have a high resistance to the crushing action of the pressure of sea water external to the hose, together with crushing forces generated by axially loaded helical reinforcing wires, and on the other hand must be capable of containing the high pressures occuring at times in the oil supply from the well. Furthermore, it is highly desirable for some applications that such hose has a substantially regular or smooth bore to minimize wear and abrasion at the hose inner surface and ensure that the hose does not present an unduly high resistance to the flow of fluid therethrough.

In addition, for ease of installation and laying of the hose, it is desirable that it is relatively flexible so as to be capable of being stored on storage drums. Also flexibility is required where the hose extends between the sea bed and a floating structure.

In one earlier proposed construction of hose for the above purpose, an impervious layer of rubber-like material is sandwiched between an outer protective layer of helically wound steel strip and an inner reinforcement of a conduit of metal rings or helices constructed to interlock with one another so as to be relatively slidable to permit flexing of the hose while providing a high degree of crush resistance and reinforcement strength. Such hose, however, is expensive to manufacture and does not provide a substantially smooth internal bore.

In another earlier proposed construction of hose a reinforcement of at least one layer of steel wire is embedded in rubber-like material of the hose wall to provide the necessary strength and crush resistance for arduous duty in service. The reinforcement is usually applied by winding a stout steel wire onto the partially assembled hose, but extreme difficulties arise due to the high stiffness of the wire which tends to cut into the soft rubber of the uncured hose carcass onto which it is being wound.

It is an object of the present invention to provide a flexible hose having an improved reinforcement structure.

According to one aspect of the present invention a flexible hose comprises a lining layer of substantially impermeable material, a reinforcement structure comprising at least one balanced pair of helically extending reinforcement members, embedded in elastomeric material, to withstand internal pressure and axial tensile loadings, and radially inwards of at least the reinforcement structure an armouring layer to resist radial crushing loads, said armouring layer comprising at least two helical reinforcing elements nested together and shaped such that contacting surfaces of the elements between the successive turns of the helices are of a substantially frusto-conical shape.

The lining layer may be provided radially inwards of the armouring layer and define the bore of the hose, especially where a smooth bore is particularly required, or it may be sandwiched between the reinforcement structure and armouring layer. In the latter case the armouring layer may define the bore of the hose and this is especially desirable where the hose bore is required to have a high resistance to abrasion by pigging tools which are passed through the hose.

The reinforcing elements may be constituted by wires, which may be provided in monofilant, strand, cable, or cord form, or may be of other form such as strip form. The elements may be of materials such as glass or Kevlar (Trade Mark), and preferably have a high tensile strength.

To ensure that the crush resisting armouring layer has a good degree of flexibility it is preferred that the two contacting surfaces between three successive turns of the armouring layer are of a substantially frusto-conical shape and each taper in opposite directions relative to the length of the hose.

It is also preferred that the armouring layer be formed from only one pair of reinforcing elements but, particularly for hose of relatively larger diameter, more than one pair of reinforcing elements may be provided, with each pair constituting a sub-layer within the armouring layer.

One particularly suitable cross-sectional shape for the reinforcing elements of the crush-resisting armouring layer is a triangular shape, with the bases of the successive turns lying parallel to the direction of the length of the hose and the bases of successive turns facing alternately radially inwards and radially outwards of the armouring layer. Thus where the armouring layer is formed from a pair of triangular cross-section wires, one wire would be wound with its base facing radially inwards and the other with its base facing radially outwards. In addition, it is preferred that the corners of the triangular cross-sectional shapes are curved so that the armouring coil presents a substantially smooth bore where it is exposed radially inwards of the hose, or so as to inhibit cutting or abrasion of any layers of polymeric material adjacent either the radially inner or radially outer surfaces of the armouring coil.

Preferably the contacting surfaces are substantially smooth or provided with a coating of low-friction (i.e. coefficient of friction less than 0.3) so that successive turns may slide radially relative to each other to permit flexing of the hose without causing extensive wear at said surfaces.

When it is desired to limit the normal range of flexibility of the hose to within a predetermined degree of curvature, the contacting surface may be of stepped shape. It may thereby be ensured that successive turns are free to slide radially relative to each other up to a predetermined extent which is sufficient to accommodate the desired predetermined degree of curvature, but that shoulders of the stepped shape then abut to restrict further sliding and curvature.

The hose may be provided with a cover layer of polymeric material which is waterproof and so able to protect the reinforcement structure and armouring layer reinforcing wires or elements from excessive corrosion.

The hose may additionally be provided with an external armouring and this may comprise one or more helically wound strips of metallic or similar material with the successive turns being spaced apart such that the hose is relatively free to flex until, unless otherwise earlier restrained, the successive turns of the external armouring come into abutment.

To provide a hose which has good flexibility and long life it is believed particularly desirable that the armouring layer should be free to slide relative to the material of any adjacent layer(s) of polymeric material. The provision of an adjacent layer of low friction material such as nylon is believed to be particularly advantageous.

Two embodiments of the invention will now be described, by way of example, with reference to the accompanying diagrammatic drawings in which.

Figure 1:
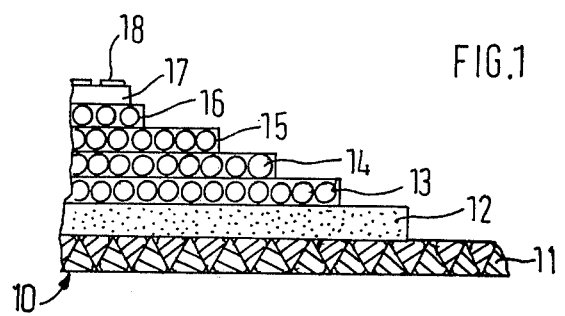
FIG. 1 shows in part section a hose in accordance with the present invention.
Figure 2:
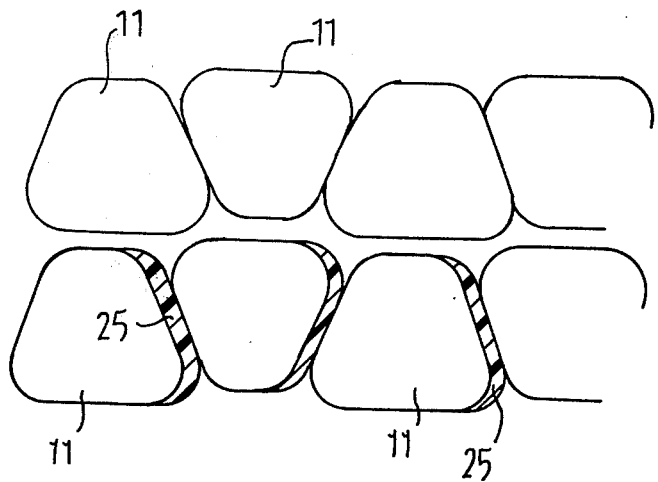
FIG. 2 shows in detail the helical armouring coil of a hose similar to that of FIG. 1 but with an inner armouring coil also.

An underwater flexible oil hose, as illustrated in FIGS. 1 and 2, comprises a radially inner armouring layer 10 formed from a pair of helically extending steel wires 11 each of triangular shape and nested together so as to form a substantially smooth-surfaced tubular reinforcement layer.

The armouring coil is surrounded by a fluid sealing layer 12 of oil resisting nitrile rubber, and this in turn is surrounded by a reinforcement structure comprising two layers 13,14 of helically wound wire cord embedded in nitrile rubber. Each of the helical wires of layers 13, 14 extend in opposite senses and these layers are surrounded by two similar layers 15, 16 in which the helical wires also extend in opposite senses. The reinforcing structure of layers 13 to 16 is in turn surrounded by a substantially impermeable layer 17 of water resisting neoprene, and this layer is surrounded in turn by an external armouring in the form of a steel strip 18 wound such that successive turns are spaced apart.

FIG. 1 shows the wires 11 of the armouring layer 10 as being of a generally triangular shape but slightly curved at the corners of the wires so that the bases of alternate turns of the two wires (i.e. successive turns of the same wire) are spaced apart slightly. FIG. 1 is only diagrammatic and the preferred cross-sectional shape of the wires of the armouring layer is shown in FIG. 2, where the wires will be seen to have a substantially trapezoidal cross-section. In order to permit relative radial slipping between successive turns of the armouring layer during flexing of the hose it is important that the bases of alternative turns are spaced apart. If the bases were not spaced apart their abutment would restrict relative radial movement between adjacent turns.

Figure 3:
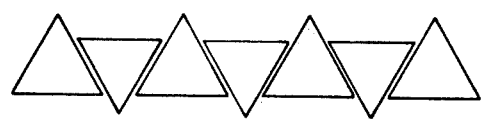
FIGS. 3 and 4 show in detail alternative helical armouring coils.

It is not essential that the armouring layer is formed from wires of a triangular or trapezoidal cross-section having rounded corners since, as illustrated with reference to FIG. 3, the wires may be of a simple triangular shape and arranged to be radially offset relative to one another, but this results in an uneven surface finish to the armouring layer.

Figure 4:

A further alternative cross-section for the armouring layer wires is shown in FIG. 4. The wires 19 are of a stepped shape at the contacting surfaces between successive turns and abutment of shoulders 20 during flexing limits the normal curvature of the hose.

Figure 5:
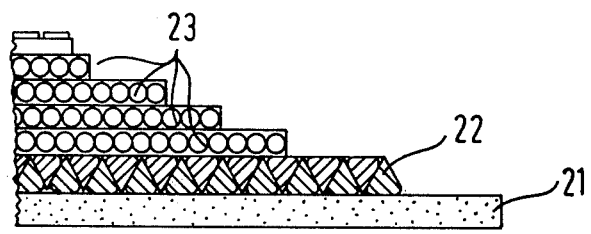
FIG. 5 shows in part section another hose in accordance with the present invention.

In a second embodiment of the invention, illustrated with reference to FIG. 5, a hose is constructed substantially similar to the hose illustrated in FIGS. 1 and 2 except that the radially inner fluid sealing layer 21 is provided radially inwards of the armouring layer 22, with the reinforcing structure 23 of helically extending embedded wires lying directly on the armouring layer.

During the flexing of hoses in accordance with the present invention there is a relative radial displacement between the wires of the armouring layer, with the successive turns sliding relative to one another but yet remaining in abutting contact. Despite this relative radial movement there is very little change in cross-section of the bore of the hose and accordingly little change in impedence to the flow of fluid therethrough. Particularly if a cross-sectional shape such as that of FIG. 2 is adopted for the wires of the armouring layer the relative radial movement results in very little deformation and straining of the adjacent layers of polymeric material.

While the armouring layer is intended mainly to provide crush resistance to the hose it also serves to resist axial compression loadings. It is, however, of little assistance in withstanding axial tensile loading and for this purpose the reinforcement structure, for example that of the helically-extending wires embedded in polymeric material, is designed to withstand not only radially outward forces due to the pressure of fluid within the hose, but also axial tensile loadings.

As shown in FIG. 2, there may be two pairs of reinforcing elements in the armouring layer, each pair constituting a sub-layer within the armouring layer. Alternatively, as shown on one of the layers in FIG. 2, the contacting surface may be provided with a coating 25 of low friction material.

Having now described our invention what we claim is:

1. A flexible hose comprising a lining layer of substantially impermeable material, a reinforcement structure comprising at least one balanced pair of helically extending reinforcement members, embedded in elastomeric material, to withstand internal pressure and axial tensile loadings, and radially inwards of at least the reinfocement structure an armouring layer to resist radial crushing loads, said armouring layer comprising one pair of helical reinforcing elements nested together and shaped such that contacting surfaces of the elements between the successive turns of the helices are of a substantially frusto-conical shape.

2. A flexible hose according to claim 1 wherein the two contacting surfaces between three successive turns of the armouring layer are of substantially frusto-conical shape and each taper in opposite directions relative to the length of the hose.

3. A flexible hose according to claim 1 wherein the reinforcing elements of the armouring layer are of substantially triangular shape.

4. A flexible hose according to claim 3 wherein the bases of the successive turns of the armouring layer lie parallel to the direction of the length of the hose and said bases face alternately radially inwards and radially outwards of the armouring layer.

5. A flexible hose according to claim 3 wherein the corners of the substantially triangular cross-sectional shapes are curved.

6. A flexible hose according to claim 1 wherein the reinforcement structure is surrounded by a cover layer.

7. A flexible hose according to claim 1 provided with an external armouring.

8. A flexible hose according to claim 1 wherein the lining layer comprises nitrile rubber.

9. A flexible hose comprising a lining layer of substantially impermeable material, a reinforcement structure comprising at least one balanced pair of helically extending reinforcement members, embedded in elastomeric material, to withstand internal pressure and axial tensile loadings, and radially inwards of at least the reinforcement structure an armouring layer to resist radial crushing loads, said armouring layer comprising at least two pairs of helical reinforcing elements each constituting a sub-layer within the armouring layer, each nested together and shaped such that contacting surfaces of the elements between the successive turns of the helices are of a substantially frusto-conical shape.

10. A flexible hose comprising a lining layer of substantially impermeable material, a reinforcement structure comprising at least one balanced pair of helically extending reinforcement members, embedded in elastomeric material, to withstand internal pressure and axial tensile loadings, and radially inwards of at least the reinforcement structure an armouring layer to resist radial crushing loads, said armouring layer comprising at least two helical reinforcing elements nested together and shaped such that contacting surfaces of the elements between the successive turns of the helices are of a substantially frusto-conical shape with the contacting surfaces having a coating of low-friction material.

11. A flexible hose comprising a lining layer of substantially impermeable material, a reinforcement structure comprising at least one balanced pair of helically extending reinforcement members, embedded in elastomeric material, to withstand internal pressure and axial tensile loadings, and radially inwards of at least the reinforcement structure an armouring layer to resist radial crushing loads, said armouring layer comprising at least two helical reinforcing elements nested together and shaped such that contacting surfaces of the elements between the successive turns of the helices are of a substantially frusto-conical shape and have a stepped shape to limit the normal range of flexibility of the hose to within a predetermined degree of curvature.

12. A flexible hose comprising a lining layer of substantially impermeable material, a reinforcement structure comprising at least one balanced pair of helically extending reinforcement members, embedded in elastomeric material, to withstand internal pressure and axial tensile loadings, and radially inwards of at least the reinforcement structure an armouring layer to resist radial crushing loads, said armouring layer comprising at least two helical reinforcing elements nested together and shaped such that contacting surfaces of the elements between the successive turns of the helices are of a substantially frusto-conical shape and an external armouring comprising at least one helically wound strip of metallic material with successive turns spaced apart.

13. A flexible hose comprising a lining layer of substantially impermeable material, a reinforcement structure comprising at least one balanced pair of helically extending reinforcement members, embedded in elastomeric material, to withstand internal pressure and axial tensile loadings, and radially inwards of the reinforcement structure and the lining layer, an armouring layer to resist radial crushing loads, said armouring layer comprising at least two helical reinforcing elements nested together and shaped such that contacting surfaces of the elements between the successive turns of the helices are of a substantially frusto-conical shape.

14. A flexible hose according to claim 13 wherein the two contacting surfaces between successive turns of the armouring layer each taper in opposite directions relative to the length of the hose.

15. A flexible hose according to claim 13 wherein the armouring layer comprises at least two pairs of reinforcing elements with each pair constituting a sub-layer within the armouring layer.

16. A flexible hose according to claim 13 wherein the reinforcing elements of the armouring layer are of substantially triangular shape.

17. A flexible hose according to claim 16 wherein the bases of the successive turns of the armouring layer lie parallel to the direction of the length of the hose and said bases face alternately radially inwards and radially outwards of the armouring layer.

18. A flexible hose according to claim 16 wherein the corners of the substantially triangular cross-sectional shapes are curved.

19. A flexible hose according to claim 13 wherein contacting surfaces of the reinforcing elements of the armouring layer are provided with a coating of low-friction material.

20. A flexible hose according to claim 13 wherein the contacting surfaces of the reinforcing elements of the armouring layer are of a stepped shape to limit the normal range of flexibility of the hose to within a predetermined degree of curvature.

21. A flexible hose according to claim 13 wherein the reinforcement structure is surrounded by a cover layer.

22. A flexible hose according to claim 13 provided with an external armouring.

23. A flexible hose according to claim 22 wherein the external armouring comprises one or more helically wound strips of metallic or similar material with the successive turns spaced apart.

24. A flexible hose according to claim 13 wherein the lining layer is provided between the armouring layer and the flexible reinforcement structure.

25. A flexible hose according to claim 13 wherein the lining layer is radially inwards of the armouring layer.

26. A flexible hose according to claim 13 wherein the lining layer comprises nitrile rubber.

27. A flexible hose comprising a lining layer of substantially impermeable material, a reinforcement structure comprising at least one balanced pair of helically extending reinforcement members, embedded in elastomeric material, to withstand internal pressure and axial tensile loadings, and radially inwards of the reinforcement structure an armouring layer comprising at least two helical reinforcing elements nested together and shaped such that contacting surfaces of the elements between the successive turns of the helices are of a substantially frusto-conical shape, said lining layer being radially inwards of the armouring layer.

* * * * *